March 10, 1953  J. R. HOWE  2,630,905
ADJUSTABLE GRAIN ELEVATOR
Filed Jan. 17, 1949  2 SHEETS—SHEET 1
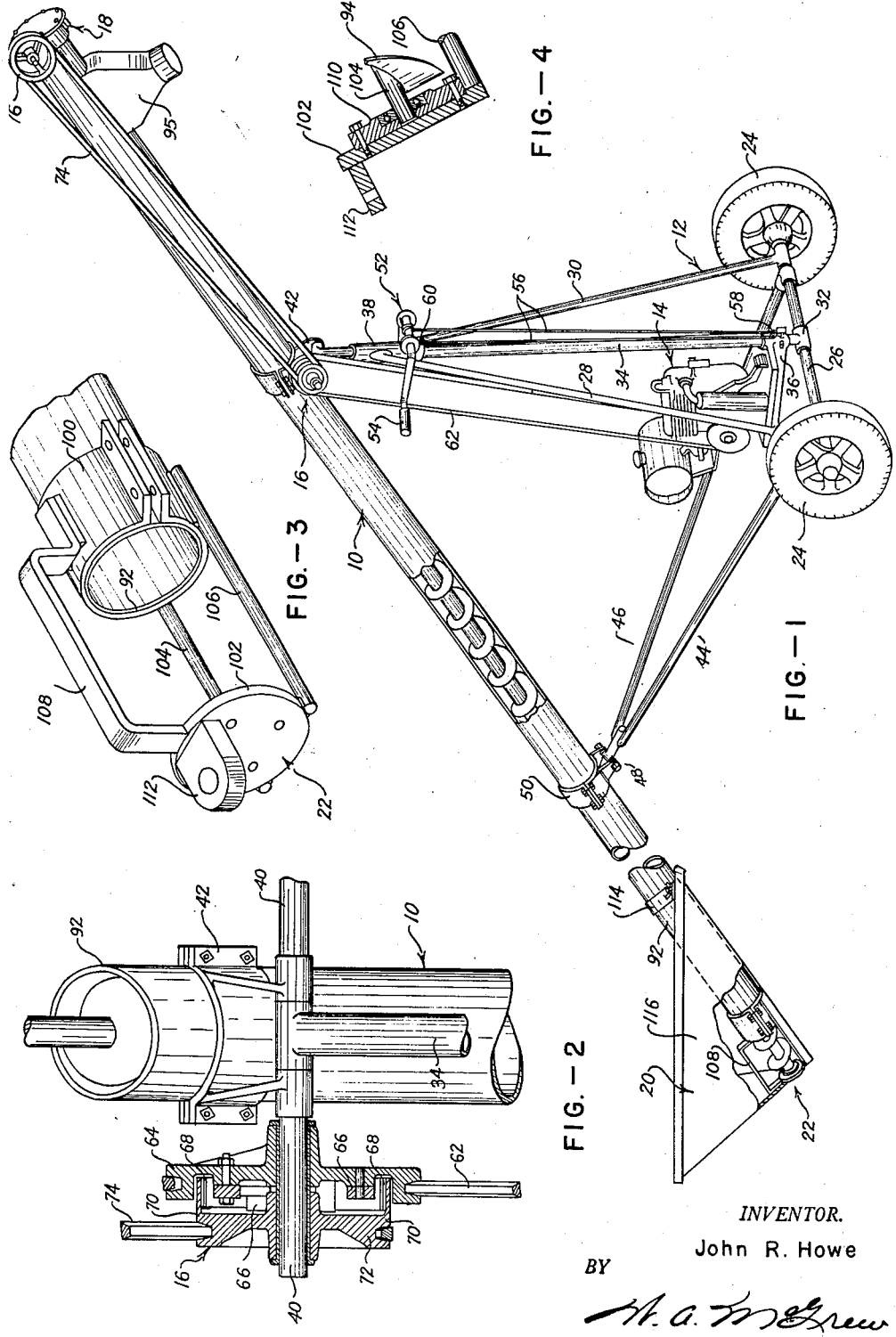
INVENTOR.
John R. Howe
BY
*H. A. McGrew*
ATTORNEY March 10, 1953 — J. R. HOWE — 2,630,905
ADJUSTABLE GRAIN ELEVATOR
Filed Jan. 17, 1949 — 2 SHEETS—SHEET 2
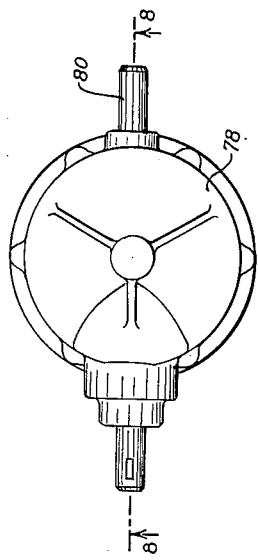
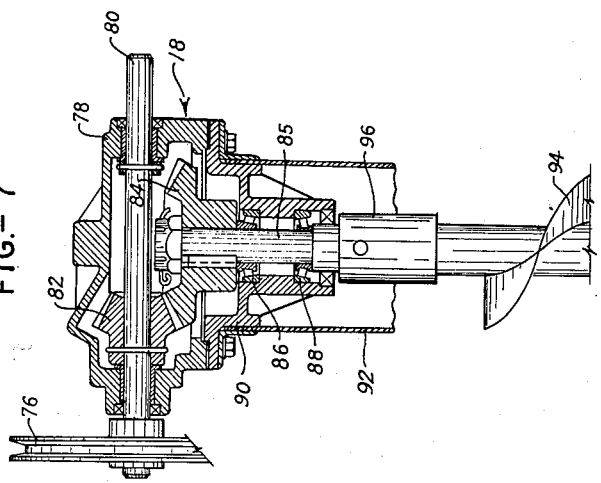
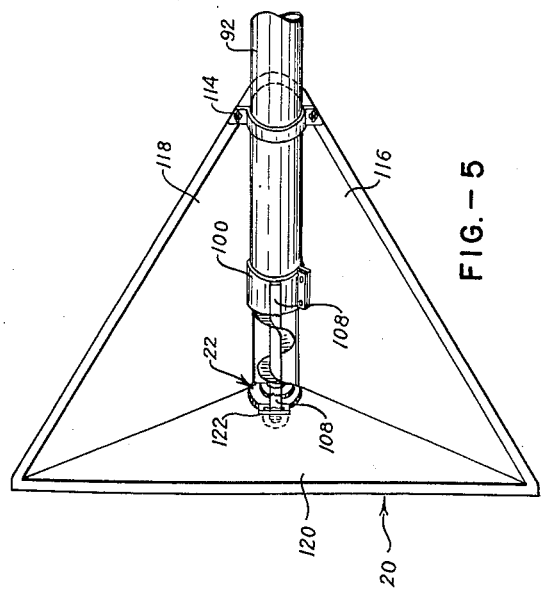
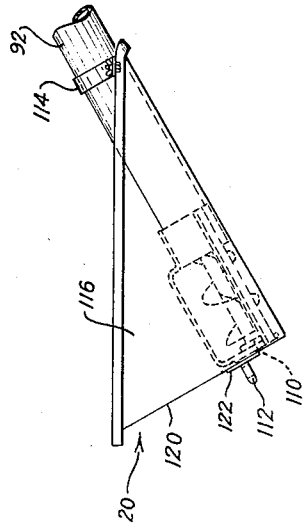
*INVENTOR.*
John R. Howe
BY
ATTORNEY Patented Mar. 10, 1953

2,630,905

UNITED STATES PATENT OFFICE 2,630,905

ADJUSTABLE GRAIN ELEVATOR

John R. Howe, Denver, Colo.

Application January 17, 1949, Serial No. 71,343

4 Claims. (Cl. 198—53)

This invention relates to improvements in apparatus for elevating and loading granular material such as grain, and especially to such apparatus having a screw feed conveyor for raising the granular material to an elevated point of discharge, a self-contained source of power, and elevating means for adjusting the height of the discharge point.

One object of the present invention is to provide a device of the character described having drive means mounted on the upper portion of the conveyor and a motor mounted on the elevating means in fixed relation to the drive means so that the motor is moved upwardly with the upper discharge portion of the conveyor during elevation of the latter.

Another object of the present invention is the provision of suitable linkage adapted to maintain the elevating means in a substantially vertical position during the operative movement thereof and the motor mounting in a substantially horizontal plane.

A further object of the invention is the provision of suitable automatic clutch means in said drive means whereby the device may be used with any available portable source of power.

A still further object of this invention is to provide an improved, detachable hopper and feed means for the conveyor including a trailer hitch and handle which can be utilized with or without the hopper.

Other objects and advantages will be apparent from the following description and drawings illustrating one preferred embodiment of the present invention in which:

Fig. 1 is a perspective view in partial section showing the grain loader in the lowered position;

Fig. 2 is a detail view partly in section showing the upper pivotal support and the clutch mechanism on the conveyor;

Fig. 3 is a perspective view of the conveyor tail piece;

Fig. 4 is a detail sectional view of the bearing plate end of the conveyor tail piece shown in Fig. 3;

Fig. 5 is a top plan view of the conveyor hopper;

Fig. 6 is a side elevational view of the conveyor hopper shown in Fig. 5;

Fig. 7 is an end view of the conveyor gear head; and

Fig. 8 is a sectional view taken on the line 8—8 of Fig. 7.

Referring now to the drawings in detail a conveyor 10 is mounted on a wheeled frame 12 and is driven by a motor 14 through a centrifugal clutch 16 and gear head 18. A hopper 20 is detachably mounted on the lower end of conveyor 10 around the tail piece 22.

Wheeled frame

The wheeled frame 12 consists of a pair of wheels 24 mounted on an axle 26 which rigidly supports a telescoping tubular assembly having upwardly converging braces 28 and 30, and a central vertical guide member 32. Slidably mounted on guide 32 is a tubular slide 34 on which is secured the base 36 for motor 14. Slide 34 extends vertically through a tubular guide 38 secured to the upper ends of braces 28 and 30, and is pivotally connected on shaft 40 to clamp 42 on conveyor 10. (See Fig. 2.)

Rearwardly converging braces 44 and 46 are pivotally connected at one end to axle 26 and at the other end by pin 48 to another bracket 50 mounted lower on conveyor 10.

A hand windlass 52 having a handle 54 is mounted on the guide 38 for raising or lowering slide 34, the upper portion of conveyor 10, and the motor 14 on base 36. A cable 56 is wound around windlass 52 and extends around a pulley 58 on base 36 and back to an eye 60 on guide 38.

The braces 44 and 46 are proportioned and bracket 50 is positioned on the conveyor 10 so that the distance from pivot pin 48 to the point where wheels 24 rest on the ground or other supporting surface is equal to the distance from pin 48 to the point where tail piece 22 or hopper 20 rests on the ground, and is also equal to the distance from pin 48 to shaft 40.

Due to the above relationship the guide member 32 and slide 34 will remain in a substantially vertical position and the motor base 36 will remain in a substantially horizontal position as the slide 34 is raised or lowered on guide 32 by windlass 52.

This is particularly important, when a portable gasoline motor is used, to maintain efficient carburetion and lubrication, although other types of motors such as an electric motor may be used.

Centrifugal clutch

As best seen in Fig. 2 motor 14 drives conveyor 10 by a belt 62 passing around a drive pulley 64 on clutch 16. Pulley 64 has two pivotally mounted shoes 66 mounted internally thereof and adapted to engage a lining 68 inside the cylindrical flange 70 on a second drive pulley 72. The shoes 66 are held out of contact with lining 68 by springs (not shown) until the speed of pulley 64 is increased and centrifugal force overcomes the spring tension.

Pulley 72 by belt 74 drives another pulley 76 mounted on gear head 18.

Gear head

The gear head 18 as best shown in Figs. 7 and 8 consists of a cap 78 through which extends a shaft 80 mounted in suitable bearings. Pulley 76 is mounted on the outer end of shaft 80 and a small diameter bevel gear 82 is mounted on shaft 80 within the cap 78. Bevel gear 82 meshes with a larger diameter bevel gear 84 which is mounted on a shaft 85 in roller thrust bearings 86 and 88 in a bushing 90.

Conveyor

Bushing 90 is mounted in the upper end of an elongated cylindrical tube 92 through which extends the screw 94 of conveyor 10. The upper end of screw 94 is coupled to shaft 85 by a pin coupling 96 as shown in Fig. 8. The screw 94 extends through tube 92 to the opposite end and into tail piece 22 which is secured on the lower end of tube 92. The granular material such as grain is forced upwardly from tail piece 22 through tube 92 by screw 94 and out through a discharge spout 95.

Tail piece

The tail piece 22 as shown in Figs. 1, 3, 4 and 5 is secured to the lower end of tube 92 by a clamp ring 100 and has a bearing plate 102 spaced from clamp ring 100 by braces 104 and 106, and handle 108. A ball bearing 110 is bolted to the bearing plate 102 to provide a lower bearing for screw 94. Bearing 110 will take some thrust, although most of the thrust is taken by upper bearings 86 and 88. A trailer hitch 112 is welded or otherwise secured to the bearing plate 102 as shown.

Hopper

The grain to be loaded may be fed directly to the screw 94 through the tail piece 22, but a hopper 20 is preferably provided which is set under the lower end of the conveyor and secured to the tube 92 by a clamp 114. The hopper 20 has triangular downwardly sloping walls 116, 118 and 120 which feed the granular material dumped into the hopper toward the screw 94. A flexible slit diaphragm 122 made of sheet rubber or other suitable material is provided over an opening in wall 120 so that the slit therein may be passed over the trailer hitch 112 which extends through wall 120. Since the flexible diaphragm closely surrounds the hitch 112, materials received in the hopper 20 will be prevented from escaping out the opening in wall 120. Walls 116 and 118 join at the bottom in a curved surface which conforms to the shape of the tube 92 and tail piece 22.

Operation

In the operation of the apparatus the lower end of the conveyor 10 is raised off of the ground or other surface on which it is resting by handle 108 on tail piece 22 and wheeled into position for loading grain. Handle 54 on windlass 52 is turned to elevate the upper end of the conveyor 10 until the discharge spout is at the proper height for loading.

Motor 14 is operated at an increased speed until shoes 66 in centrifugal clutch 16 are forced out against the spring tension to engage lining 68, and through the drive mechanism previously described rotate screw 94. Grain or other granular material is fed into hopper 20 and forced upwardly through tube 92 and out of discharge spout 95.

It is apparent from the previous description that any available motor, such as a portable gasoline engine or an electric motor ordinarily used for other purposes, may be mounted on base 36 and utilized to drive the conveyor, since the centrifugal clutch 16 is mounted on the conveyor.

It is also apparent that due to location of clutch 16 and pulleys 64 and 72 on shaft 40 which also forms a pivot for conveyor 10 on slide 34, and due to the fact that motor 14 is raised and lowered with the upper portion of conveyor 10 in fixed relation with shaft 40 no adjustment of the belts is required after raising or lowering.

When it is desired to move the apparatus from one location to another, the lower end of conveyor 10 is raised by handle 108 and the trailer hitch 112 is connected to suitable towing means without removing hopper 20. In this position the apparatus is well balanced with most of the weight on wheels 24 and a small part of the weight carried on trailer hitch 112.

While one preferred embodiment of the present invention has been shown and described, it is understood that many modifications may be made without departing from the spirit and scope of the invention as set out in the following claims.

What I claim and desire to secure by Letters Patent is:

1. Apparatus for loading granular material comprising an upwardly inclined tube, a wheeled vehicle supporting said tube, a drive unit at one end of said tube, a tailpiece on the opposite end of said tube inclusive of a bearing plate, a screw conveyor mounted for rotation in said tube between said drive unit and bearing plate, a hopper on the lower end of said conveyor tube having substantially triangular walls, two of said walls converging below said conveyor tube and tail piece and being adapted for engagement with said conveyor at the apex of said walls, another of said walls abutting against the outer surface of said bearing plate and connecting said two walls, and a clamp secured to said hopper adjacent the apex of said two walls for securing said hopper on said conveyor tube.

2. Apparatus for loading granular material comprising an upwardly inclined tube, a wheeled vehicle supporting said tube, a drive unit at one end of said tube, a tailpiece on the opposite end of said tube inclusive of a bearing plate, a screw conveyor mounted for rotation in said tube between said drive unit and bearing plate, a hopper on the lower end of said conveyor tube having substantially triangular walls, two of said walls converging below said conveyor tube and tail piece, another of said walls abutting against the outer surface of said bearing plate and connecting said two walls, a clamp secured to said hopper adjacent the apex of said two walls for securing said hopper on said conveyor tube, and said walls being rounded to conform to the shape of said tube and said tail piece adjacent the convergent portions of said two walls.

3. Apparatus for loading granular material comprising an upwardly inclined tube, a wheeled vehicle supporting said tube, a drive unit at one end of said tube, a tailpiece on the opposite end of said tube inclusive of a bearing plate, a screw conveyor mounted for rotation in said tube between said drive unit and bearing plate, a hopper on the lower end of said conveyor tube having substantially triangular walls, two of said walls converging below said conveyor tube and tail piece, another of said walls abutting against the outer surface of said bearing plate and connecting said two walls, a clamp adjacent the apex of said two walls adapted to engage said conveyor tube, said walls being rounded to conform to the shape of said tube and said tail piece adjacent the convergent portions of said two walls, a trailer hitch extending outwardly from said bearing plate, an opening in said other wall aligned with said trailer hitch, and a flexible slit diaphragm covering said opening to permit said trailer hitch to extend therethrough to an accessible position outside of said hopper.

4. Apparatus for loading granular material comprising an upwardly inclined tube, a wheeled vehicle supporting said tube, a drive unit at one end of said tube, a tail piece on the opposite end of said tube inclusive of a bearing plate, a screw conveyor mounted for rotation in said tube between said drive unit and bearing plate, a hopper on the lower end of said conveyor tube having substantially triangular walls, two of said walls converging below said conveyor tube and tail piece, another of said walls abutting against the outer surface of said bearing plate and connecting said two walls, a clamp adjacent the apex of said two walls adapted to engage said conveyor tube, said walls being rounded to conform to the shape of said tube and said tail piece adjacent the convergent portions of said two walls, a trailer hitch extending outwardly from said bearing plate, an opening in said other wall aligned with said trailer hitch, a flexible slit diaphragm covering said opening to permit said trailer hitch to extend therethrough to an accessible position outside of said hopper, and a handle extending between said bearing plate and tube in spaced relation above said screw conveyor.

JOHN R. HOWE.

REFERENCES CITED

The following references are of record in the file of this patent:

UNITED STATES PATENTS

| Number | Name | Date |
| --- | --- | --- |
| 1,572,818 | Smith | Feb. 9, 1926 |
| 1,828,268 | Wilkes | Oct. 20, 1931 |
| 1,846,696 | Starkey | Feb. 23, 1932 |
| 2,298,332 | Applegate | Oct. 13, 1942 |
| 2,408,952 | Raney | Oct. 8, 1946 |
| 2,434,445 | Stormberg | Jan. 13, 1948 |
| 2,460,661 | Tintes | Feb. 1, 1949 |
| 2,483,290 | Mayrath | Sept. 27, 1949 |
| 2,492,341 | Walters | Dec. 27, 1949 |
| 2,533,261 | Howe | Dec. 12, 1950 |